US008838906B2

(12) United States Patent
Gara et al.

(10) Patent No.: US 8,838,906 B2
(45) Date of Patent: Sep. 16, 2014

(54) EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION

(75) Inventors: Alan Gara, Mount Kisco, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 12/984,308

(22) Filed: Jan. 4, 2011

(65) Prior Publication Data

US 2011/0173392 A1 Jul. 14, 2011

Related U.S. Application Data (60) Provisional application No. 61/295,669, filed on Jan. 15, 2010, provisional application No. 61/293,611, filed on Jan. 8, 2010, provisional application No. 61/299,911, filed on Jan. 29, 2010, provisional application No. 61/293,237, filed on Jan. 8, 2010, provisional application No. 61/293,494, filed on Jan. 8, 2010.

(51) Int. Cl.
*G06F 13/00* (2006.01)

(52) U.S. Cl.
USPC ........... 711/137; 711/138; 711/140; 711/142; 711/133; 711/135; 711/122; 711/144; 711/145; 712/216; 712/214; 712/215; 712/225; 712/229; 718/106

(58) Field of Classification Search
USPC ......... 711/137, 138, 140, 144, 145, 133, 135, 711/122, 142; 712/214, 215, 216, 225, 229; 718/106
See application file for complete search history.

(56) References Cited

U.S. PATENT DOCUMENTS

| 5,895,492 A | 4/1999 | Greenspan et al. |
| 6,212,605 B1 | 4/2001 | Arimilli et al. |
| 6,347,360 B1 | 2/2002 | Moudgal et al. |

(Continued)

OTHER PUBLICATIONS

Calder et al., "A comparative Survey of Load Speculation Architectures", Journal of Instruction-Level Parallelism 1 (2000) 1-39, published May 2000, pp. 1-34.*

(Continued)

*Primary Examiner* — Hong Kim
(74) *Attorney, Agent, or Firm* — Scully, Scott, Murphy & Presser, P.C.; Daniel P. Morris, Esq.

(57) ABSTRACT

In a multiprocessor system with at least two levels of cache, a speculative thread may run on a core processor in parallel with other threads. When the thread seeks to do a write to main memory, this access is to be written through the first level cache to the second level cache. After the write though, the corresponding line is deleted from the first level cache and/or prefetch unit, so that any further accesses to the same location in main memory have to be retrieved from the second level cache. The second level cache keeps track of multiple versions of data, where more than one speculative thread is running in parallel, while the first level cache does not have any of the versions during speculation. A switch allows choosing between modes of operation of a speculation blind first level cache.

7 Claims, 9 Drawing Sheets

(56) References Cited

U.S. PATENT DOCUMENTS

| | | |
|---|---|---|
| 6,356,983 B1 | 3/2002 | Parks |
| 6,460,130 B1 | 10/2002 | Trull et al. |
| 6,564,302 B1* | 5/2003 | Yagi et al. ............... 711/144 |
| 7,350,027 B2* | 3/2008 | Gara et al. ............... 711/121 |
| 7,404,041 B2* | 7/2008 | Gara et al. ............... 711/121 |
| 7,500,087 B2* | 3/2009 | Saha ....................... 712/235 |
| 7,523,266 B2* | 4/2009 | Chaudhry et al. ....... 711/141 |
| 8,205,067 B2 | 6/2012 | Kriegel et al. |
| 2002/0083297 A1 | 6/2002 | Modelski et al. |
| 2002/0133672 A1 | 9/2002 | Van De Waerdt et al. |
| 2002/0199070 A1* | 12/2002 | Chaudhry et al. ....... 711/147 |
| 2003/0014597 A1 | 1/2003 | van de Waerdt |
| 2004/0193845 A1 | 9/2004 | Thimmannagari et al. |
| 2005/0204119 A1* | 9/2005 | Saha ....................... 712/235 |
| 2006/0041722 A1* | 2/2006 | Hakura et al. ........... 711/137 |
| 2006/0090044 A1 | 4/2006 | Hillier, III et al. |
| 2006/0095680 A1 | 5/2006 | Park et al. |
| 2006/0143390 A1 | 6/2006 | Kottapallo |
| 2006/0161740 A1 | 7/2006 | Kottapalli et al. |
| 2006/0161919 A1 | 7/2006 | Onufryk et al. |
| 2007/0028021 A1 | 2/2007 | Gaskins |
| 2007/0067573 A1 | 3/2007 | Bruening et al. |
| 2007/0168619 A1 | 7/2007 | Hutton et al. |
| 2007/0192540 A1* | 8/2007 | Gara et al. ............... 711/117 |
| 2007/0294481 A1 | 12/2007 | Hoover et al. |
| 2008/0195820 A1 | 8/2008 | Lais et al. |
| 2008/0307169 A1 | 12/2008 | Averill et al. |
| 2008/0313437 A1 | 12/2008 | Gschwind |
| 2009/0024835 A1* | 1/2009 | Fertig et al. ............. 712/207 |
| 2009/0031310 A1 | 1/2009 | Lev et al. |
| 2009/0083488 A1* | 3/2009 | Madriles Gimeno et al. 711/118 |
| 2009/0235262 A1 | 9/2009 | Ceze et al. |
| 2009/0268736 A1 | 10/2009 | Allison et al. |
| 2009/0276581 A1 | 11/2009 | Moga et al. |
| 2010/0122038 A1* | 5/2010 | Manovit et al. ........ 711/144 |
| 2010/0169577 A1 | 7/2010 | Kiyota |
| 2010/0205609 A1* | 8/2010 | Cypher .................... 718/105 |
| 2010/0235580 A1 | 9/2010 | Bouvier |
| 2010/0235598 A1 | 9/2010 | Bouvier |
| 2010/0332765 A1 | 12/2010 | Cypher |
| 2011/0055484 A1* | 3/2011 | Eichenberger et al. ....... 711/125 |
| 2011/0066811 A1 | 3/2011 | Sander et al. |
| 2011/0119446 A1* | 5/2011 | Blumrich et al. ........ 711/122 |
| 2011/0138126 A1* | 6/2011 | Blundell et al. ......... 711/125 |
| 2011/0145501 A1 | 6/2011 | Steely, Jr. et al. |
| 2011/0208894 A1* | 8/2011 | Gala et al. ............... 711/3 |
| 2011/0231612 A1 | 9/2011 | Karlsson et al. |

OTHER PUBLICATIONS

Notice of Allowance dated May 7, 2013 received in a related U.S. Appl. No. 12/984,252.
Office Action dated Apr. 3, 2013 received in a related U.S. Appl. No. 13/008,546.
Office Action dated Apr. 15, 2013 received in a related U.S. Appl. No. 13/008,583.
Office Action dated Nov. 26, 2012 received in a related U.S. Appl. No. 13/008,546.
Ceze et al., Bulk Disambiguation of Speculative Threads in Multiprocessors, 2006, IEEE, pp. 7-9.
Office Action dated Sep. 6, 2013, received in related U.S. Appl. No. 13/008,546.

* cited by examiner

EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION

CROSS-REFERENCE TO RELATED APPLICATIONS

This application is being filed concurrently with U.S. patent application Ser. No. 12/984,329 ("Address Aliasing"), which is incorporated by reference.

Benefit of the following applications is claimed and they are also incorporated by reference: U.S. provisional patent application Ser. No. 61/293,611, filed Jan. 8, 2010; U.S. provisional patent application Ser. No. 61/295,669, filed Jan. 15, 2010; U.S. provisional patent application Ser. No. 61/293,237, filed Jan. 8, 2010; U.S. provisional patent application Ser. No. 61/293,494, filed Jan. 8, 2010; U.S. provisional patent application Ser. No. 61/299,911 filed Jan. 29, 2010. This application relates to the following commonly-owned applications which are also incorporated by reference: U.S. patent application Ser. No. 12/796,411 filed Jun. 8, 2010; U.S. patent application Ser. No. 12/696,780, filed Jan. 29, 2010; U.S. patent application Ser. No. 12/684,367, filed Jan. 8, 2010; U.S. patent application Ser. No. 12/684,172, filed Jan. 8, 2010; U.S. patent application Ser. No. 12/684,190, filed Jan. 8, 2010; U.S. patent application Ser. No. 12/684,496, filed Jan. 8, 2010; U.S. patent application Ser. No. 12/684,429, filed Jan. 8, 2010; U.S. patent application Ser. No. 12/697,799 filed Feb. 1, 2010; U.S. patent application Ser. No. 12/684,738, filed Jan. 8, 2010; U.S. patent application Ser. No. 12/684,860, filed Jan. 8, 2010; U.S. patent application Ser. No. 12/684,174, filed Jan. 8, 2010; U.S. patent application Ser. No. 12/684,184, filed Jan. 8, 2010; U.S. patent application Ser. No. 12/684,852, filed Jan. 8, 2010; U.S. patent application Ser. No. 12/684,642, filed Jan. 8, 2010; U.S. patent application Ser. No. 12/684,804, filed Jan. 8, 2010; U.S. patent application Ser. No. 12/693,972, filed Jan. 26, 2010; U.S. patent application Ser. No. 12/688,747, filed Jan. 15, 2010; U.S. patent application Ser. No. 12/688,773, filed Jan. 15, 2010; U.S. patent application Ser. No. 12/684,776, filed Jan. 8, 2010; U.S. patent application Ser. No. 12/696,825, filed Jan. 29, 2010; U.S. patent application Ser. No. 12/684,693, filed Jan. 8, 2010; U.S. patent application Ser. No. 12/731,796, filed Mar. 25, 2010; U.S. patent application Ser. No. 12/696,746, filed Jan. 29, 2010; U.S. patent application Ser. No. 12/697,015 filed Jan. 29, 2010; U.S. patent application Ser. No. 12/727,967, filed Mar. 19, 2010; U.S. patent application Ser. No. 12/727,984, filed Mar. 19, 2010; U.S. patent application Ser. No. 12/697,043 filed Jan. 29, 2010; U.S. patent application Ser. No. 12/697,175, Jan. 29, 2010; U.S. patent application Ser. No. 12/684,287, filed Jan. 8, 2010; U.S. patent application Ser. No. 12/684,630, filed Jan. 8, 2010; U.S. patent application Ser. No. 12/723,277 filed Mar. 12, 2010; U.S. patent application Ser. No. 12/696,764, filed Jan. 29, 2010; U.S. patent application Ser. No. 12/696,817 filed Jan. 29, 2010; U.S. patent application Ser. No. 12/697,164, filed Jan. 29, 2010; U.S. patent application Ser. No. 12/796,411, filed Jun. 8, 2010; and, U.S. patent application Ser. No. 12/796,389, filed Jun. 8, 2010.

GOVERNMENT CONTRACT

This invention was made with Government support under Contract No.: B554331 awarded by Department of Energy. The Government has certain rights in this invention.

BACKGROUND

The invention relates to managing speculation with respect to cache memory in a multiprocessor system with multiple threads, some of which may execute speculatively.

Prior multiprocessor systems have introduced the idea of executing software threads in parallel. Sometimes the individual core processors of a multiprocessor system have had actual circuitry supporting thread level execution. Such circuitry is called hardware threading. The following document relates to the concept of simultaneous multithreading, ie. more than one thread per core:

Tullsen, D. M., Eggers, S. J., and Levy, H. M. 1995, "Simultaneous multithreading: maximizing on-chip parallelism," in Proceedings of the $22^{nd}$ Annual international Symposium on Computer Architecture (S. Margherita Ligure, Italy, Jun. 22-24, 1995). ISCA '95. ACM, New York, N.Y., 392-403, DOI=http://doi.acm.org/10.1145/223982.224449

Multithreading allows a program to be broken up into segments that are known to be independent and to execute them in concurrently by multiple hardware threads. Also, for known dependencies, segments can be executed overlapped with synchronization honoring the dependencies.

The state of the art approach to executing threads speculatively allows segments with dependencies not known at compile time to be executed concurrently, with hardware tracking and insuring compliance with potential dependencies. This approach involves keeping track of thread meta data in the core and storing the results of speculative execution in main memory, under control of the core, until speculation was resolved. After speculation was resolved, speculative results would either become committed or be deleted. This approach requires core modules that are customized to the particular parallel processing system. Accordingly, for each new generation of parallel processing system, a new core has to be researched.

SUMMARY

It is desirable to make at least one cache level speculation blind in a multiprocessor system making no or at most minimal modifications to a commodity processing core's integrated cache.

In a parallel processing system including a plurality of cores configured to run speculative threads in parallel, and at least one each of first and second level caches, a method embodiment includes carrying out operations. The operations include:
  determining whether a speculative thread seeks to write;
  upon a positive determination, writing from the speculative thread through the first level cache to the second level cache;
  evicting a line from the first level cache corresponding to the writing; and
  resolving speculation downstream from the first level cache.

In a parallel processing system including a plurality of cores and at least first and second levels of cache, another method embodiment includes:
  maintaining the first level cache responsive to selectively operable in accordance with at least first and second modes of speculation blind addressing; and
  choosing one of the first and second modes, responsive to program related considerations.

In a further embodiment, a parallel processing system includes a plurality of cores configured to run speculative threads in parallel, and at least one each of first and second level caches.

The system is adapted to carry out operations including those listed for the second method above.

In still a further embodiment, a computer program product is adapted to operate in a speculative multiprocessor environment, the computer program product comprising: a storage medium readable by a processing circuit and storing instructions run by the processing circuit for carrying out the second method above.

Objects and advantages will be apparent in the following.

BRIEF DESCRIPTION OF DRAWING

Embodiments will now be described by way of non-limiting example with reference to the following figures.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In a multiprocessor system with generic cores, it becomes easier to design new generations and expand the system. Advantageously, speculation management can be moved downstream from the core and first level cache. In such a case, it is desirable to devise schemes of accessing the first level cache without explicitly keeping track of speculation.

There may be more than one modes of keeping the first level cache speculation blind. Advantageously, the system will have a mechanism for switching between such modes.

One such mode is to evict writes from the first level cache, while writing through to a downstream cache. The embodiments described herein show this first level cache as being the physically first in a data path from a core processor; however, the mechanisms disclose here might be applied to other situations. The terms "first" and "second," when applied to the claims herein are for convenience of drafting only and are not intended to be limiting to the case of L1 and L2 caches.

As described herein, the use of the letter "B"—other than as part of a figure number—represents a Byte quantity, while "GB" represents Gigabyte quantities. Throughout this disclosure a particular embodiment of a multi-processor system will be discussed. This discussion includes various numerical values for numbers of components, bandwidths of interfaces, memory sizes and the like. These numerical values are not intended to be limiting, but only examples. One of ordinary skill in the art might devise other examples as a matter of design choice.

The term "thread" is used herein. A thread can be either a hardware thread or a software thread. A hardware thread within a core processor includes a set of registers and logic for executing a software thread. The software thread is a segment of computer program code. Within a core, a hardware thread will have a thread number. For instance, in the A2, there are four threads, numbered zero through three. Throughout a multiprocessor system, such as the nodechip 50 of FIG. 1, software threads can be referred to using speculation identification numbers ("IDs"). In the present embodiment, there are 128 possible IDs for identifying software threads.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

If speculation fails, the results must be invalidated and the thread must be re-run or some other workaround found.

Three modes of speculative execution are to be supported: Speculative Execution (SE) (also referred to as Thread Level Speculation ("TLS")), Transactional Memory ("TM"), and Rollback.

SE is used to parallelize programs that have been written as sequential program. When the programmer writes this sequential program, she may insert commands to delimit sections to be executed concurrently. The compiler can recognize these sections and attempt to run them speculatively in parallel, detecting and correcting violations of sequential semantics When referring to threads in the context of Speculative Execution, the terms older/younger or earlier/later refer to their relative program order (not the time they actually run on the hardware).

In Speculative Execution, successive sections of sequential code are assigned to hardware threads to run simultaneously. Each thread has the illusion of performing its task in program order. It sees its own writes and writes that occurred earlier in the program. It does not see writes that take place later in program order even if (because of the concurrent execution) these writes have actually taken place earlier in time.

To sustain the illusion, the L2 gives threads private storage as needed, accessible by software thread ID. It lets threads read their own writes and writes from threads earlier in program order, but isolates their reads from threads later in program order. Thus, the L2 might have several different data values for a single address. Each occupies an L2 way, and the L2 directory records, in addition to the usual directory information, a history of which thread IDs are associated with reads and writes of a line. A speculative write is not to be written out to main memory.

One situation that will break the program-order illusion is if a thread earlier in program order writes to an address that a thread later in program order has already read. The later thread should have read that data, but did not. The solution is to kill the later software thread and invalidate all the lines it has written in L2, and to repeat this for all younger threads. On the other hand, without such interference a thread can complete successfully, and its writes can move to external main memory when the line is cast out or flushed.

Not all threads need to be speculative. The running thread earliest in program order can be non-speculative and run conventionally; in particular its writes can go to external main memory. The threads later in program order are speculative and are subject to be killed. When the non-speculative thread completes, the next-oldest thread can be committed and it then starts to run non-speculatively.

The following sections describe the implementation of the speculation model in the context of addressing.

When a sequential program is decomposed into speculative tasks, the memory subsystem needs to be able to associate all memory requests with the corresponding task. This is done by assigning a unique ID at the start of a speculative task to the thread executing the task and attaching the ID as tag to all its requests sent to the memory subsystem.

As the number of dynamic tasks can be very large, it may not be practical to guarantee uniqueness of IDs across the entire program run. It is sufficient to guarantee uniqueness for all IDs concurrently present in the memory system. More about the use of speculation ID's, including how they are allocated, committed, and invalidated, appears in the incorporated applications.

Transactions as defined for TM occur in response to a specific programmer request within a parallel program. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation."

To enable a TM runtime system to use the TM supporting hardware, it needs to allocate a fraction of the hardware resources, particularly the speculation IDs that allow hardware to distinguish concurrently executed transactions, from the kernel (operating system), which acts as a manager of the hardware resources. The kernel configures the hardware to group IDs into sets called domains, configures each domain for its intended use, TLS, TM or Rollback, and assigns the domains to runtime system instances At the start of each transaction, the runtime system executes a function that allocates an ID from its domain, and programs it into a register that starts marking memory access as to be treated as speculative, i.e., revocable if necessary.

When the transaction section ends, the program will make another call that ultimately signals the hardware to do conflict checking and reporting. Based on the outcome of the check, all speculative accesses of the preceding section can be made permanent or removed from the system.

The PowerPC architecture defines an instruction pair known as larx/stcx. This instruction type can be viewed as a special case of TM. The larx/stcx pair will delimit a memory access request to a single address and set up a program section that ends with a request to check whether the instruction pair accessed the memory location without interfering access from another thread. If an access interfered, the memory modifying component of the pair is nullified and the thread is notified of the conflict More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure.

Rollback occurs in response to "soft errors", temporary changes in state of a logic circuit. Normally these errors occur in response to cosmic rays or alpha particles from solder balls. The memory changes caused by a programs section executed speculatively in rollback mode can be reverted and the core can, after a register state restore, replay the failed section.

Figure 1:
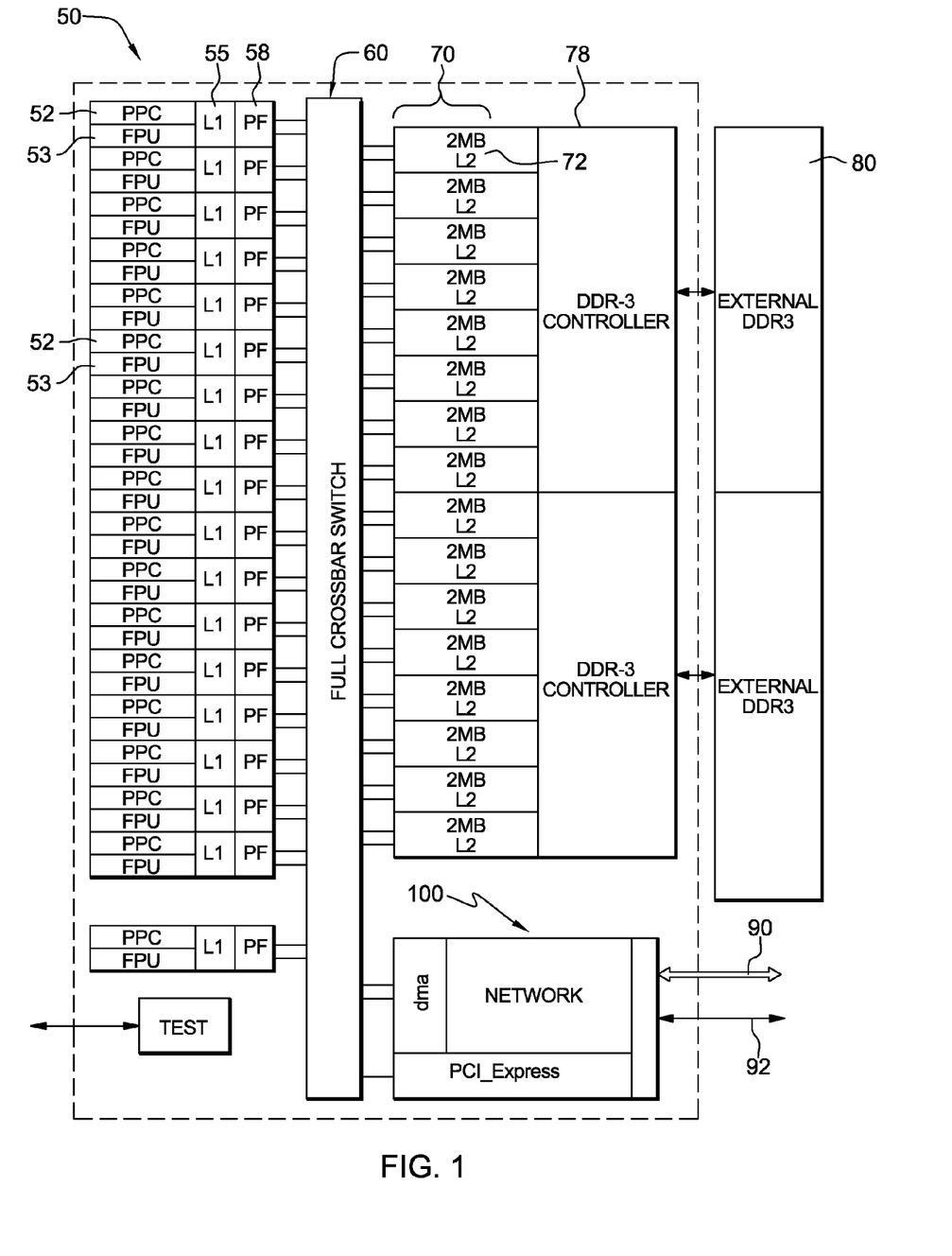
FIG. 1 shows an overview of a nodechip within which caching improvements are implemented

Referring now to FIG. 1, there is shown an overall architecture of a multiprocessor computing node 50 implemented in a parallel computing system in which the present embodiment may be implemented. The compute node 50 is a single chip ("nodechip") based on PowerPC cores, though the architecture can use any cores, and may comprise one or more semiconductor chips.

More particularly, the basic nodechip 50 of the multiprocessor system illustrated in FIG. 1 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 associated with each core. The 16 cores 52 do the computational work for application programs.

The 17$^{th}$ core is configurable to carry out system tasks, such as
- reacting to network interface service interrupts, distributing network packets to other cores;
- taking timer interrupts
- reacting to correctable error interrupts,
- taking statistics
- initiating preventive measures
- monitoring environmental status (temperature), throttle system accordingly.

In other words, it offloads all the administrative tasks from the other cores to reduce the context switching overhead for these.

In one embodiment, there is provided 32 MB of shared L2 cache 70, accessible via crossbar switch 60. There is further provided external Double Data Rate Synchronous Dynamic Random Access Memory ("DDR SDRAM") 80, as a lower level in the memory hierarchy in communication with the L2. Herein, "low" and "high" with respect to memory will be taken to refer to a data flow from a processor to a main memory, with the processor being upstream or "high" and the main memory being downstream or "low."

Each FPU 53 associated with a core 52 has a data path to the L1-cache 55 of the CORE, allowing it to load or store from or into the L1-cache 55. The terms "L1" and "L1D" will both be used herein to refer to the L1 data cache.

Figure 3:
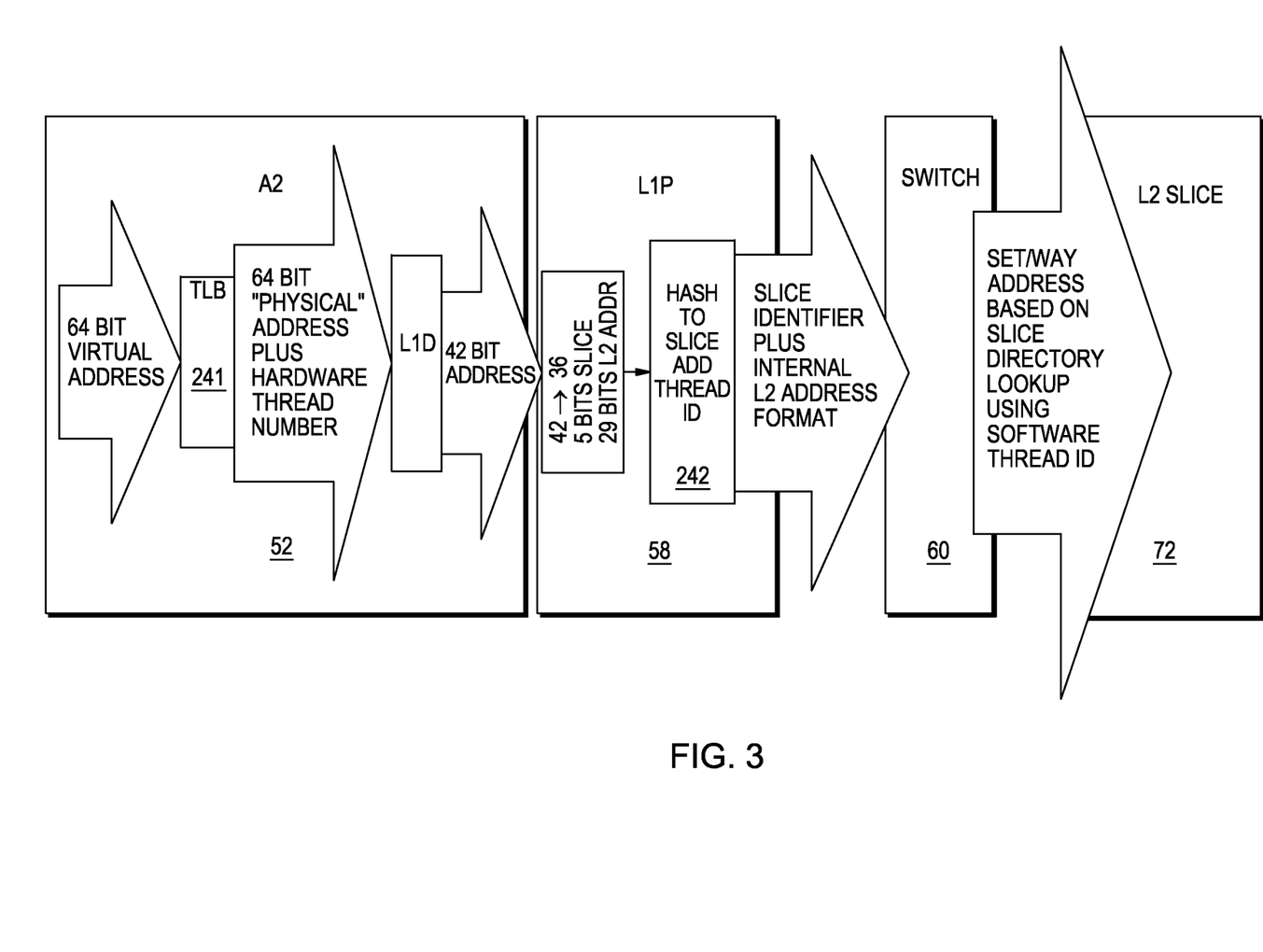
FIG. 3 is a conceptual diagram showing different address representations at different points in a communications pathway.
Figure 4:
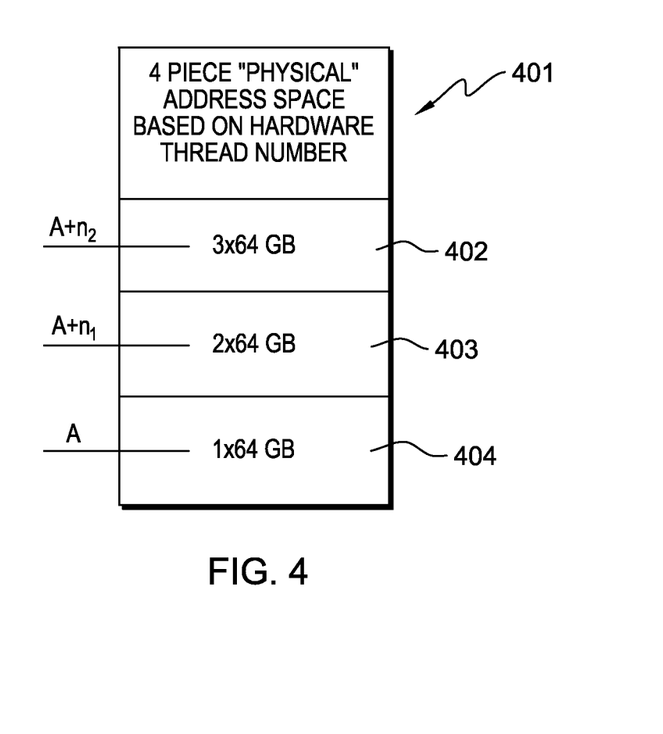
FIG. 4 shows a four piece "physical" address space used by the L1D cache.
Figure 9:
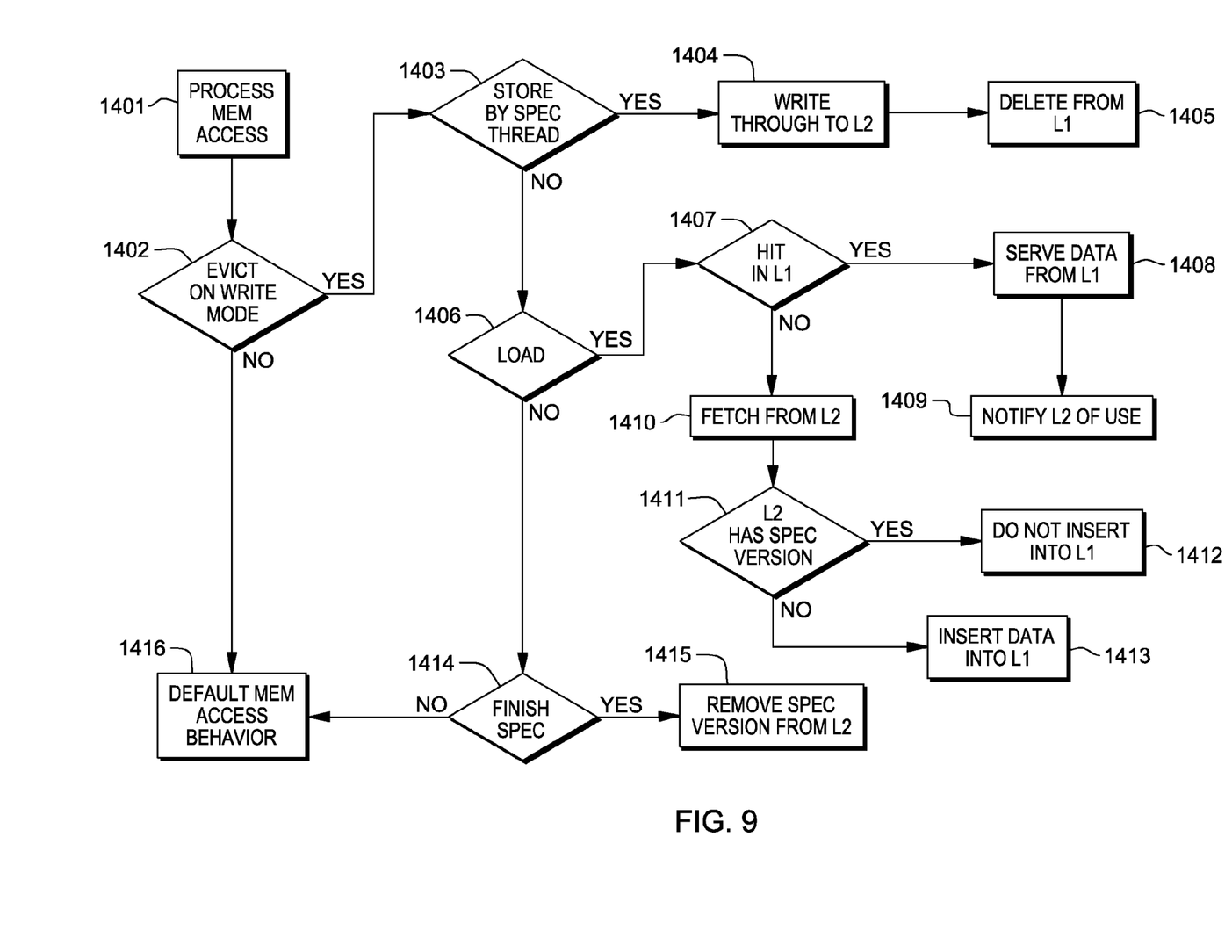
FIG. 9 shows a flowchart of a method for using the embodiment of FIG. 8.

Each core 52 is directly connected to a supplementary processing agglomeration 58, which includes a private prefetch unit. For convenience, this agglomeration 58 will be referred to herein as "L1P"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be grouped together. This is a matter of drawing organization, not of substance. Some of the additional processing power of this L1P group is shown in FIGS. 3, 4 and 9. The L1P group also accepts, decodes and dispatches all requests sent out by the core 52.

By implementing a direct memory access ("DMA") engine referred to herein as a Messaging Unit ("MU") such as MU 100, with each MU including a DMA engine and Network Card interface in communication with the XBAR switch, chip I/O functionality is provided. In one embodiment, the compute node further includes: intra-rack interprocessor links 90 which may be configurable as a 5-D torus; and, one I/O link 92 interfaced with the interfaced with the MU. The system node employs or is associated and interfaced with a 8-16 GB memory/node, also referred to herein as "main memory."

The term "multiprocessor system" is used herein. With respect to the present embodiment this term can refer to a nodechip or it can refer to a plurality of nodechips linked together. In the present embodiment, however, the management of speculation is conducted independently for each nodechip. This might not be true for other embodiments, without taking those embodiments outside the scope of the claims.

The compute nodechip implements a direct memory access engine DMA to offload the network interface. It transfers blocks via three switch master ports between the L2-cache slices 70 (FIG. 1). It is controlled by the cores via memory mapped I/O access through an additional switch slave port. There are 16 individual slices, each of which is assigned to store a distinct subset of the physical memory lines. The actual physical memory addresses assigned to each cache slice are configurable, but static. The L2 has a line size such as 128 bytes. In the commercial embodiment this will be twice the width of an L1 line. L2 slices are set-associative, organized as 1024 sets, each with 16 ways. The L2 data store may be composed of embedded DRAM and the tag store may be composed of static RAM.

The L2 has ports, for instance a 256b wide read data port, a 128b wide write data port, and a request port. Ports may be shared by all processors through the crossbar switch 60.

In this embodiment, the L2 Cache units provide the bulk of the memory system caching on the BQC chip. Main memory may be accessed through two on-chip DDR-3 SDRAM memory controllers 78, each of which services eight L2 slices.

The L2 slices may operate as set-associative caches while also supporting additional functions, such as memory speculation for Speculative Execution (SE), which includes different modes such as: Thread Level Speculations ("TLS"), Transactional Memory ("TM") and local memory rollback, as well as atomic memory transactions.

The L2 serves as the point of coherence for all processors. This function includes generating L1 invalidations when necessary. Because the L2 cache is inclusive of the L1s, it can remember which processors could possibly have a valid copy of every line, and slices can multicast selective invalidations to such processors.

Figure 2:
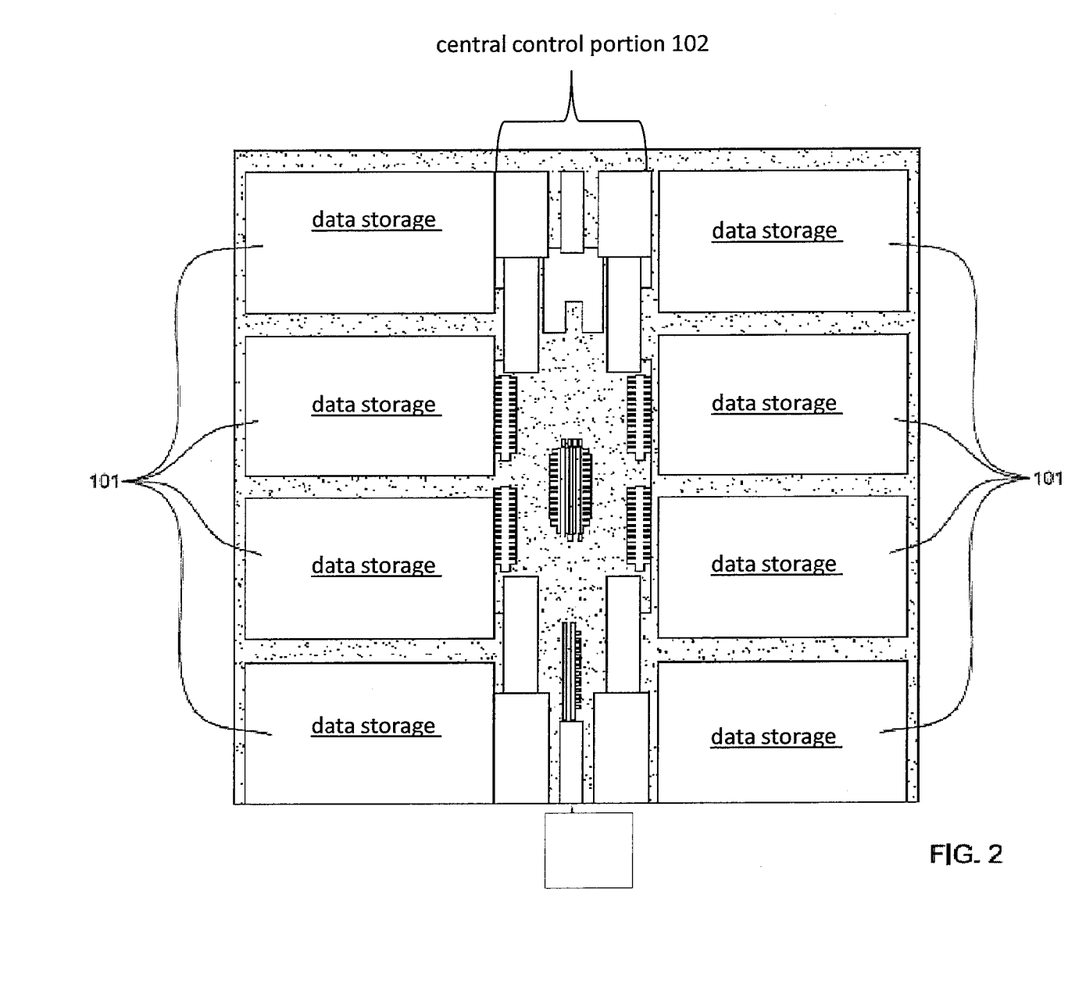
FIG. 2 shows a map of a cache slice.

FIG. 2 shows a cache slice. It includes arrays of data storage 101, and a central control portion 102.

Figure 6:
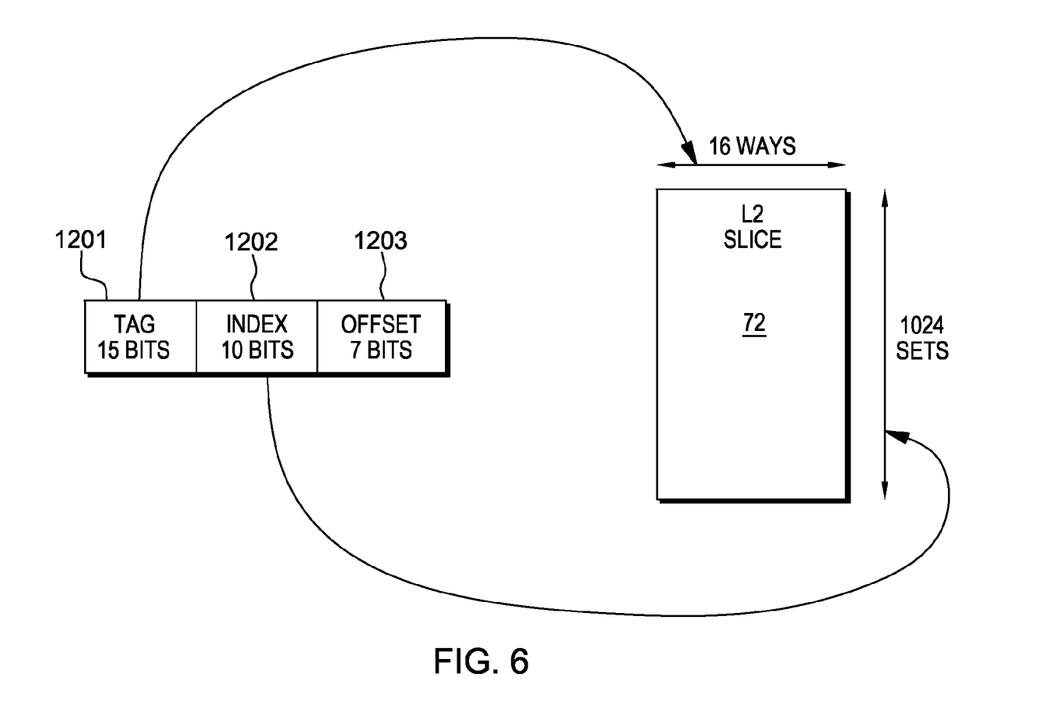
FIG. 6 shows address formatting used by the switch to locate the slice

FIG. 3 shows various address versions across a memory pathway in the nodechip 50. One embodiment of the core 52 uses a 64 bit virtual address 301 in accordance with the PowerPC architecture. In the TLB 241, that address is converted to a 42 bit "physical" address 302 that actually corresponds to 64 times the architected maximum main memory size 80, so it includes extra bits that can be used for thread identification information. The address portion used to address a location within main memory will have the canonical format of FIG. 6, prior to hashing, with a tag 1201 that matches the address tag field of a way, an index 1202 that corresponds to a set, and an offset 1203 that corresponds to a location within a line. The addressing varieties shown, with respect to the commercial embodiment, are intended to be used for the data pathway of the cores. The instruction pathway is not shown here. The "physical" address is used in the L1D 55. After arriving at the L1P, the address is stripped down to 36 bits for addressing of main memory at 304.

Figure 7:
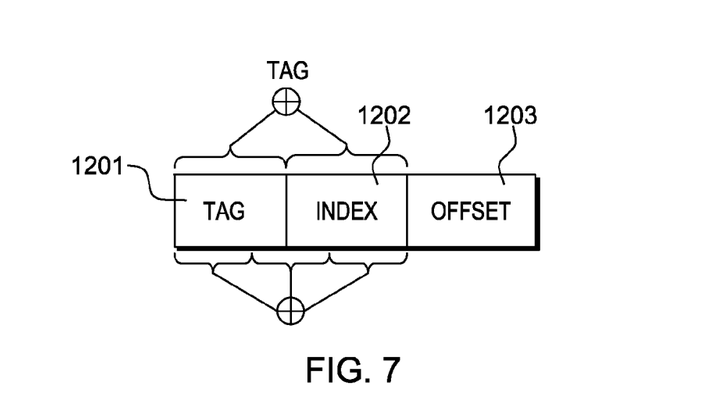
FIG. 7 shows an address format

Address scrambling per FIG. 7 tries to distribute memory accesses across L2-cache slices and within L2-cache slices across sets (congruence classes). Assuming a 64 GB main memory address space, a physical address dispatched to the L2 has 36 bits, numbered from 0 (MSb) to 35 (LSb) (a(0 to 35)).

The L2 stores data in 128B wide lines, and each of these lines is located in a single L2-slice and is referenced there via a single directory entry. As a consequence, the address bits 29 to 35 only reference parts of an L2 line and do not participate in L2 slice or set selection.

To evenly distribute accesses across L2-slices for sequential lines as well as larger strides, the remaining address bits 0-28 are hashed to determine the target slice. To allow flexible configurations, individual address bits can be selected to determine the slice as well as an XOR hash on an address can be used: The following hashing is used at 242 in the present embodiment:

L2 slice:=('0000' & a(0)) xor a(1 to 4) xor a(5 to 8) xor a(9 to 12) xor a(13 to 16) xor a(17 to 20) xor a(21 to 24) xor a(25 to 28)

For each of the slices, 25 address bits are a sufficient reference to distinguish L2 cache lines mapped to that slice.

Each L2 slice holds 2 MB of data or 16K cache lines. At 16-way associativity, the slice has to provide 1024 sets, addressed via 10 address bits. The different ways are used to store different addresses mapping to the same set as well as for speculative results associated with different threads or combinations of threads.

Again, even distribution across set indices for unit and non-unit strides is achieved via hashing, to with:

Set index:=("00000" & a(0 to 4)) xor a(5 to 14) xor a(15 to 24).

To uniquely identify a line within the set, using a(0 to 14) is sufficient as a tag.

Thereafter, the switch provides addressing to the L2 slice in accordance with an address that includes the set and way and offset within a line, as shown in FIG. 2D. Each line has 16 ways.

Figure 5:
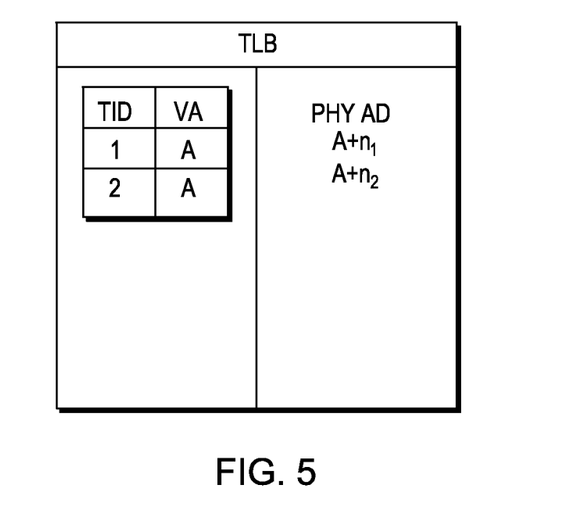
FIG. 5 is a conceptual diagram of operations in a TLB.

FIG. 5 shows the role of the Translation Lookaside Buffer ("TLB"). The role of this unit is explained in the copending Address Aliasing application Incorporated by reference above. FIG. 4 shows a four piece address space also described in more detail in the Address Aliasing application.

Long and Short Running Speculation

The L2 accommodates two types of L1 cache management in response to speculative threads. One is for long running speculation and the other is for short running speculation. The differences between the mode support for long and short running speculation is described in the following two subsections.

For long running transactions mode, the L1 cache needs to be invalidated to make all first accesses to a memory location visible to the L2 as an L1-load-miss. A thread can still cache all data in its L1 and serve subsequent loads from the L1 without notifying the L2 for these. This mode will use address aliasing as shown in FIG. 3, with the four part address space in the L1P, as shown in FIG. 4, and as further described in the Address Aliasing application incorporated by reference above.

To reduce overhead in short running speculation mode, the embodiment herein eliminates the requirement to invalidate L1. The invalidation of the L1 allowed tracking of all read locations by guaranteeing at least one L1 miss per accessed cache line. For small transactions, the equivalent is achieved by making all load addresses within the transaction visible to the L2, regardless of L1 hit or miss, i.e. by operating the L1 in "read/write through" mode. In addition, data modified by a speculative thread is in this mode evicted from the L1 cache, serving all loads of speculatively modified data from L2 directly. In this case, the L1 does not have to use a four piece mock space as shown in FIG. 4, since no speculative writes are made to the L1. Instead, it can use a single physical addressing space that corresponds to the addresses of the main memory.

Figure 8:
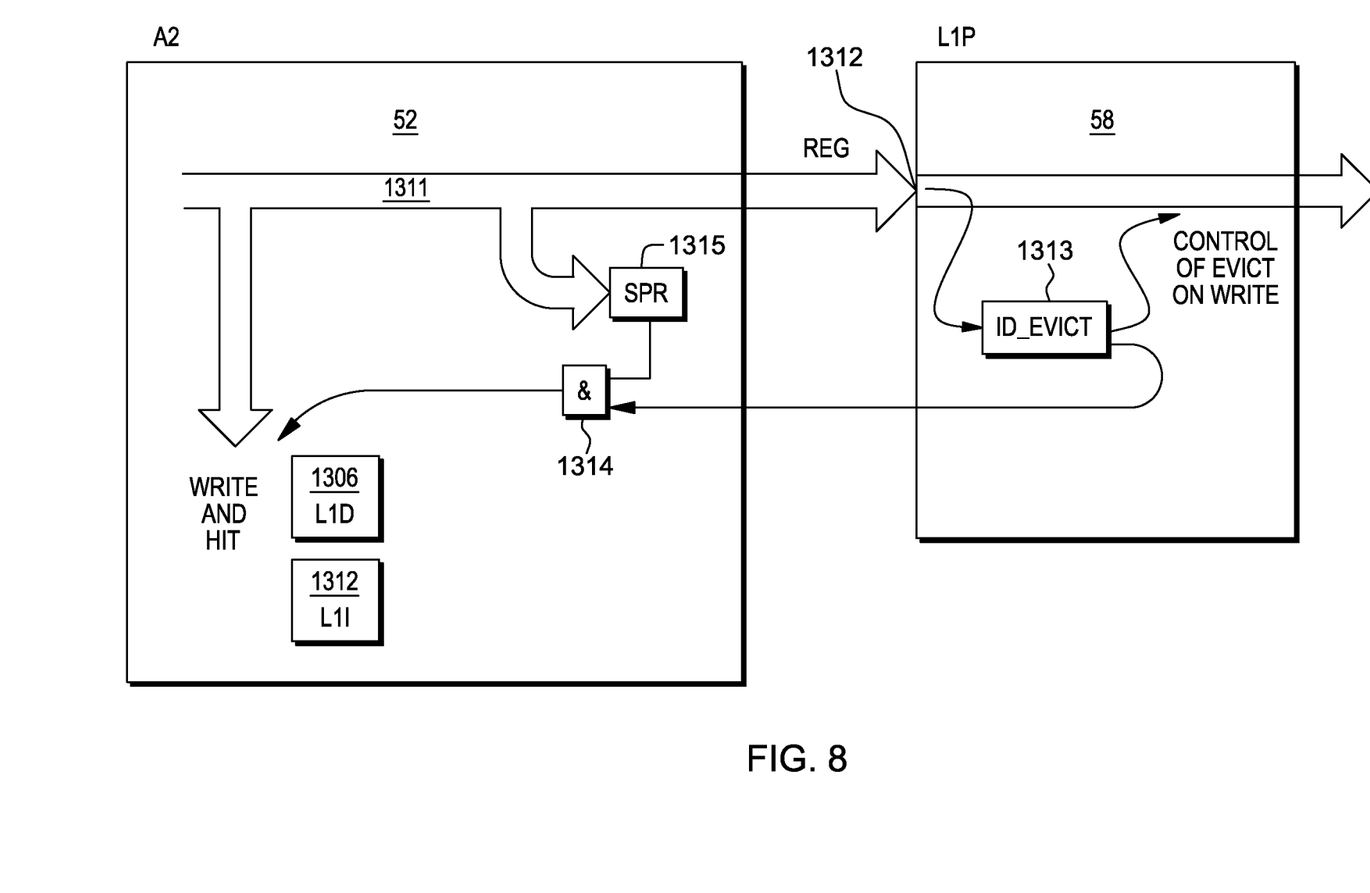
FIG. 8 shows a switch for switching between addressing modes.

FIG. 8 shows a switch for choosing between these addressing modes. The processor 52 chooses—responsive to computer program code produced by a programmer—whether to evict on write for short running speculation or do address aliasing for long-running speculation per FIGS. 3, 4, and 5.

In the case of switching between memory access modes here, a register 1312 at the entry of the L1P receives an address field from the processor 52, as if the processor 52 were requesting a main memory access, i.e., a memory mapped input/output operation (MMIO). The L1P diverts a bit called ID_evict 1313 from the register and forwards it both back to the processor 52 and also to control the L1 caches.

A special purpose register SPR 1315 also takes some data from the path 1311, which is then AND-ed at 1314 to create a signal that informs the L1D 1306, i.e. the data cache whether write on evict is to be enabled. The instruction cache, L1I 1312 is not involved.

Figure 11:
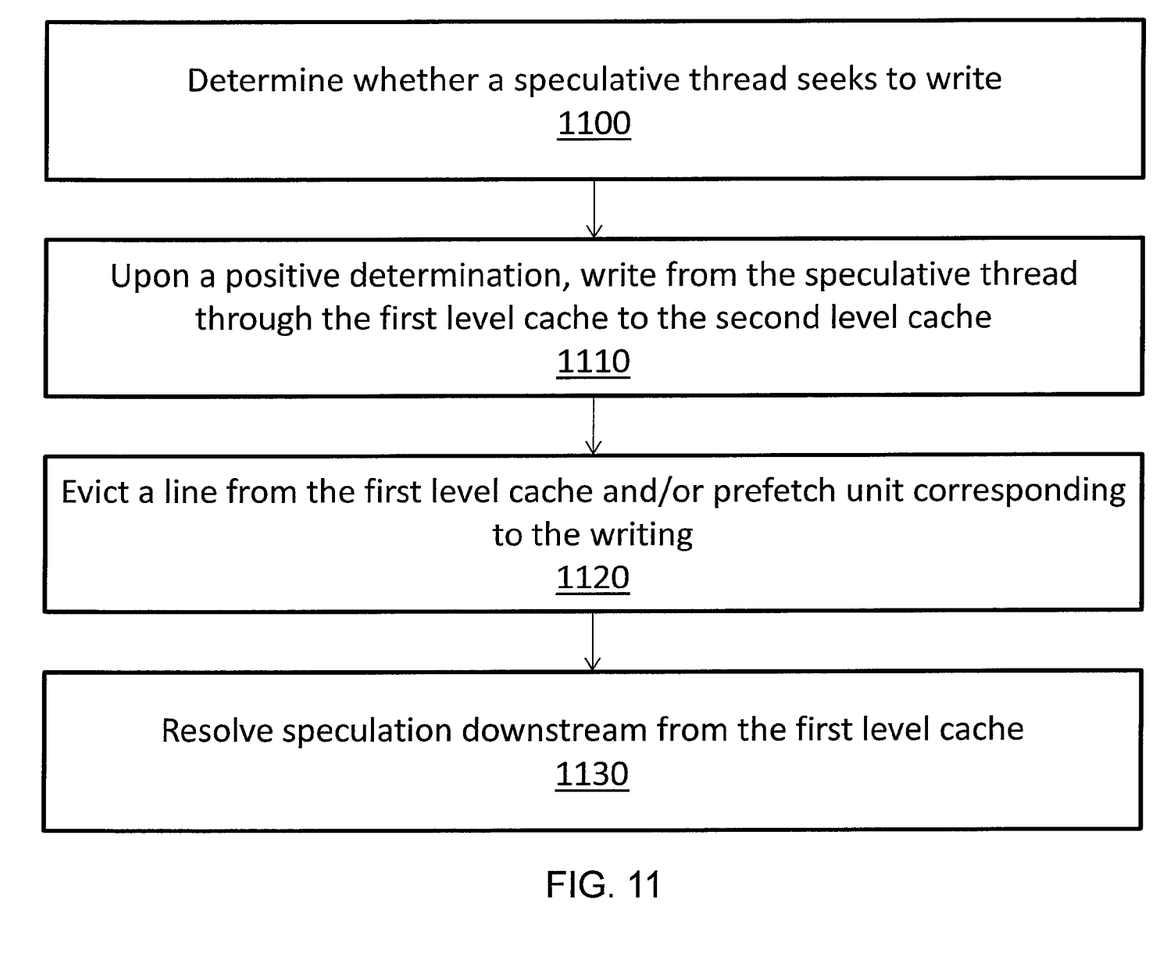
FIG. 11 is a flowchart for operating two levels of caches in a parallel processing system.

FIG. 11 is a flowchart for operating two levels of caches in a parallel processing system. The parallel processing system comprises a plurality of cores configured to run speculative threads in parallel, and at least one each of first and second level caches. The parallel processing system carries out operations. At 1100, the parallel processing system determines whether a speculative thread seeks to write. At 1110, upon a positive determination, the parallel processing system writes from the speculative thread through the first level cache to the second level cache. At 1120, the parallel processing system evicts a line from the first level cache and/or prefetch unit corresponding to the writing. At 1130, the parallel processing system resolves speculation downstream from the first level cache. FIG. 9 is a flowchart describing operations of the short running speculation embodiment. At 1401, memory access is requested. This access is to be processed responsive to the switching mechanism of FIG. 8. This switch determines whether the memory access is to be in accordance with a mode called "evict on write" or not per 1402.

At 1403, it is determined whether current memory access is responsive to a store by a speculative thread. If so, there will be a write through from L1 to L2 at 1404, but the line will be deleted from the L1 at 1405.

If access is not a store by a speculative thread, there is a test as to whether the access is a load at 1406. If so, the system must determine at 1407 whether there is a hit in the L1. If so, data is served from L1 at 1408 and L2 is notified of the use of the data at 1409.

If there is not a hit, then data must be fetched from L2 at 1410. If L2 has a speculative version per 1411, the data should not be inserted into L1 per 1412. If L2 does not have a speculative version, then the data can be inserted into L1 per 1413.

If the access is not a load, then the system must test whether speculation is finished at 1414. If so, the speculative status should be removed from L2 at 1415.

If speculation is not finished, and none of the other conditions are met, then default memory access behavior occurs at 1416.

A programmer will have to determine whether or not to activate evict on write in response to application specific programming considerations. For instance, if data is to be used frequently, the addressing mechanism of FIG. 3 will likely be advantageous.

If many small sections of code without frequent data accesses are to be executed in parallel, the mechanism of short running speculation will likely be advantageous.

L1/L1P Hit Race Condition

Figure 10:
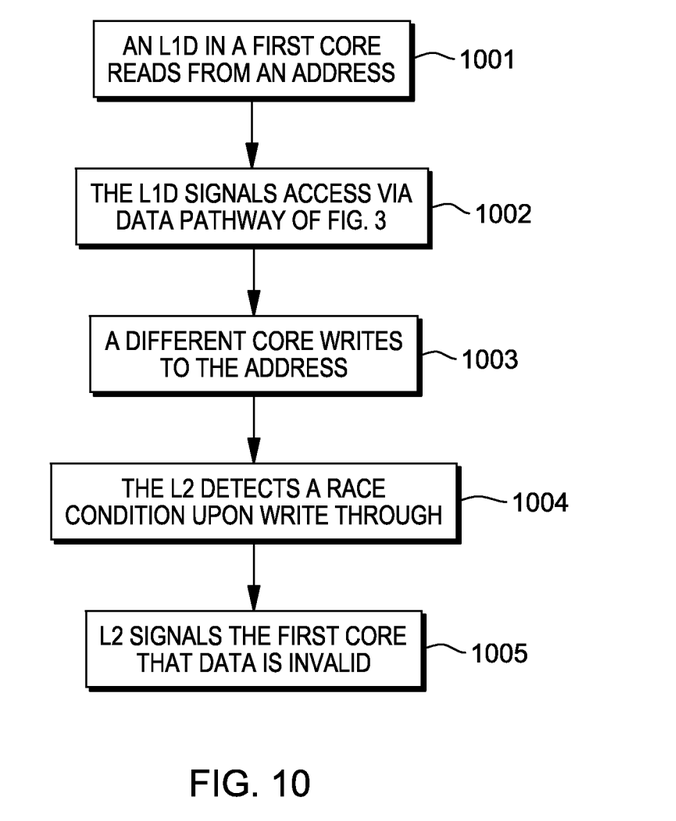
FIG. 10 is a flowchart showing handling of a race condition.

FIG. 10 shows a simplified explanation of a race condition. When the L1P prefetches data, this data is not flagged by the L2 as read by the speculative thread. The same is true for any data residing in L1 when entering a transaction in TM.

In case of a hit in L1P or L1 for TM at 1001, a notification for this address is sent to L2 1002, flagging the line as speculatively accessed. If a write from another core at 1003 to that address reaches the L2 before the L1/L1P hit notification and the write caused invalidate request has not reached the L1 or L1P before the L1/L1P hit, the core could have used stale data and while flagging new data to be read in the L2. The L2 sees the L1/L1P hit arriving after the write at 1004 and cannot deduce directly from the ordering if a race occurred. However, in this case a use notification arrives at the L2 with the coherence bits of the L2 denoting that the core did not have a valid copy of the line, thus indicating a potential violation. To retain functional correctness, the L2 invalidates the affected speculation ID in this case at 1005.

Coherence

A thread starting a long-running speculation always begins with an invalidated L1, so it will not retain stale data from a previous thread's execution. Within a speculative domain, L1 invalidations become unnecessary in some cases:

A thread later in program order writes to an address read by a thread earlier in program order. It would be unnecessary to invalidate the earlier thread's L1 copy, as this new data will not be visible to that thread.

A thread earlier in program order writes to an address read by a thread later in program order. Here there are two cases. If the later thread has not read the address yet, it is not yet in the later thread's L1 (all threads start with invalidated L1's), so the read progresses correctly. If the later thread has already read the address, invalidation is unnecessary because the speculation rules require the thread to be killed.

A thread using short running speculation evicts the line it writes to from its L1 due to the proposed evict on speculative write. This line is evicted from other L1 caches as well based on the usual coherence rules. Starting from this point on, until the speculation is deemed either to be successful or its changes have been reverted, L1 misses for this line will be served from the L2 without entering the L1 and therefore no incoherent L1 copy can occur.

Between speculative domains, the usual multiprocessor coherence rules apply. To support speculation, the L2 routinely records thread IDs associated with reads; on a write, the L2 sends invalidations to all processors outside the domain that are marked as having read that address.

Access Size Signaling from the L1/L1p to the L2

Memory write accesses footprints are always precisely delivered to L2 as both L1 as well as L1P operate in writethrough.

For reads however, the data requested from the L2 does not always match its actual use by a thread inside the core. However, both the L1 as well as the L1P provide methods to separate the actual use of the data from the amount of data requested from the L2.

The L1 can be configured such that it provides on a read miss not only the 64B line that it is requesting to be delivered, but also the section inside the line that is actually requested by the load instruction triggering the miss. It can also send requests to the L1P for each L1 hit that indicate which section of the line is actually read on each hit. This capability is activated and used for short running speculation. In long running speculation, L1 load hits are not reported and the L2 has to assume that the entire 64B section requested has been actually used by the requesting thread.

The L1P can be configured independently from that to separate UP prefetch requests from actual L1P data use (L1P hits). If activated, L1P prefetches only return data and do not add IDs to speculative reader sets. L1P read hits return data to the core immediately and send to the L2 a request that informs the L2 about the actual use of the thread.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice. Such media might be of any suitable type, such as magnetic, electronic, solid state, or optical.

Any algorithms given herein can be implemented as computer program code and stored on a machine readable medium, to be performed on at least one processor. Alternatively, they may be implemented as hardware. They are not intended to be executed manually or mentally.

The use of variable names in describing operations in a computer does not preclude the use of other variable names for achieving the same function. Ordinal numbers are used in the claims herein for clarification between elements. These ordinal numbers do not imply order of operation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

From reading the present disclosure, other modifications will be apparent to persons skilled in the art. Such modifications may involve other features which are already known in the field and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Use of ordinal numbers, such as "first" or "second," is for distinguishing otherwise identical terminology, and is not intended to imply that operations or steps must occur in any particular order, unless otherwise indicated.

Where software or algorithms are disclosed, anthropomorphic or thought-like language may be used herein. There is, nevertheless, no intention to claim human thought or manual operations, unless otherwise indicated. All claimed operations are intended to be carried out automatically by hardware or software.

Where software or hardware is disclosed, it may be drawn with boxes in a drawing. These boxes may in some cases be conceptual. They are not intended to imply that functions described with respect to them could not be distributed to multiple operating entities; nor are they intended to imply that functions could not be combined into one module or entity—unless otherwise indicated.

The invention claimed is:

1. In a parallel processing system comprising a plurality of cores configured to run speculative threads in parallel, and at least one each of first and second level caches, a method comprising carrying out operations, the operations comprising:
    determining whether a speculative thread seeks to write;
    upon a positive determination, writing from the speculative thread through the first level cache to the second level cache;
    evicting a line from the first level cache and/or prefetch unit corresponding to the writing; and
    resolving speculation downstream from the first level cache.

2. The method of claim 1, wherein the operations comprise, subsequent to evicting, if a speculative thread seeks to access an address corresponding to the line in the first level cache, retrieving an appropriate version of data from the second level cache.

3. The method of claim 2, wherein the operations comprise tagging data retrieved from the second level cache, when there are multiple versions.

4. The method of claim 3, wherein the operations comprise not caching responsive to such tagging.

5. The method of claim 1, wherein the operations comprise, when a speculative thread reads from the first level cache, notifying the second level cache.

6. The method of claim 1, wherein the operations comprise:
   determining whether a speculation has completed; and
   if speculation has completed, allowing the first level cache to store results.

7. The method of claim 5, wherein the second level cache checks its coherence data when receiving an L1 hit notification for whether the L1 could have had a stale copy, and if so, subsequently invalidates an associated speculation.

* * * * *